United States Patent
Zhou

(10) Patent No.: US 10,652,848 B2
(45) Date of Patent: May 12, 2020

(54) METHOD FOR TRANSMITTING COMMON CONTROL INFORMATION, METHOD FOR RECEIVING COMMON CONTROL INFORMATION, BASE STATION, TERMINAL AND STORAGE MEDIUM

(71) Applicant: SPREADTRUM COMMUNICATIONS (SHANGHAI) CO., LTD., Zhangjiang Shanghai (CN)

(72) Inventor: Huayu Zhou, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 65 days.

(21) Appl. No.: 15/970,088

(22) Filed: May 3, 2018

(65) Prior Publication Data

US 2018/0324727 A1    Nov. 8, 2018

(30) Foreign Application Priority Data

May 5, 2017   (CN) .......................... 2017 1 0316033

(51) Int. Cl.
*H04W 56/00*  (2009.01)
*H04L 5/00*   (2006.01)
*H04W 72/12*  (2009.01)
*H04W 72/04*  (2009.01)

(52) U.S. Cl.
CPC .......... *H04W 56/004* (2013.01); *H04L 5/005* (2013.01); *H04W 72/042* (2013.01); *H04W 72/1289* (2013.01); *H04W 72/0446* (2013.01)

(58) Field of Classification Search
CPC ............. H04W 56/004; H04W 72/042; H04W 72/1289; H04W 72/0446; H04L 5/005
See application file for complete search history.

(56) References Cited

U.S. PATENT DOCUMENTS

| | | | |
|---|---|---|---|
| 2018/0054837 A1* | 2/2018 | Islam | H04W 74/0833 |
| 2018/0227935 A1* | 8/2018 | Zhou | H04W 72/1205 |
| 2018/0278356 A1* | 9/2018 | Zhou | H04L 5/005 |
| 2018/0279241 A1* | 9/2018 | Lee | H04W 56/001 |
| 2018/0324853 A1* | 11/2018 | Jeon | H04W 74/08 |
| 2018/0343043 A1* | 11/2018 | Hakola | H04B 7/0417 |
| 2018/0343680 A1* | 11/2018 | Jung | H04B 7/0617 |

* cited by examiner

*Primary Examiner* — Melvin C Marcelo
(74) *Attorney, Agent, or Firm* — Cantor Colburn LLP

(57) ABSTRACT

A method for transmitting common control information, a method for receiving common control information, a base station, a terminal and a storage medium are provided. The method includes: configuring the number m of synchronization signal blocks to be transmitted in a slot based on the number of symbols contained in the slot; associating symbols occupied by a common control channel with the m synchronization signal blocks based on the number m; and using beams for transmitting the m synchronization signal blocks to transmit to a terminal downlink control information of common control information corresponding to the associated symbols occupied by the common control channel, so that the terminal receives the common control information in a physical downlink shared channel indicated by the downlink control information. By the embodiments, common control information is transmitted using beam sweeping with relatively low communication resource consumption.

18 Claims, 2 Drawing Sheets

METHOD FOR TRANSMITTING COMMON CONTROL INFORMATION, METHOD FOR RECEIVING COMMON CONTROL INFORMATION, BASE STATION, TERMINAL AND STORAGE MEDIUM

CROSS-REFERENCE TO RELATED APPLICATIONS

The present application claims priority under 35 U.S.C. § 119 to Chinese patent application No. 201710316033.0, filed on May 5, 2017, the entire content of which is incorporated herein by reference.

TECHNICAL FIELD

The present disclosure generally relates to communication technology field, and more particularly, to a method for transmitting common control information, a method for receiving common control information, a base station, a terminal and a storage medium.

BACKGROUND

Common control channel is one type of physical downlink control channel (Physical Downlink Control Channel, PDCCH). A control resource set used by the common control channel is referred to as Common Control Resource Set (CCRS), and messages transmitted by the common control channel are referred to as common control messages (also known as common control information in the art). Currently, a base station transmits to a User Equipment (UE) Downlink Control Information (DCI) carrying common control information to the terminal, and the UE obtains the DCI by blind detection and receives various common control information, such as system information or paging message, in a Physical Downlink Shared Channel (PDSCH) indicated by the DCI.

In 5G systems, synchronization signals and physical broadcast channels are transmitted through synchronization signal blocks (SS-block), and a beam sweeping function is introduced. However, how to use beam sweeping to realize the transmission of common control information with relatively low communication resource consumption becomes an urgent problem to be solved.

SUMMARY

By embodiments of the present disclosure, common control information is transmitted using beam sweeping with relatively low communication resource consumption.

In an embodiment, a method for transmitting common control information is provided, including: configuring the number m of synchronization signal blocks to be transmitted in a slot based on the number of symbols contained in the slot; associating symbols occupied by a common control channel with the m synchronization signal blocks based on the number m; and using beams for transmitting the m synchronization signal blocks to transmit to a terminal downlink control information of common control information corresponding to the associated symbols occupied by the common control channel, so that the terminal receives the common control information in a physical downlink shared channel indicated by the downlink control information.

Optionally, the number of the symbols occupied by the common control channel is two.

Optionally, configuring the number m of synchronization signal blocks to be transmitted in a slot based on the number of symbols contained in the slot may include: when a slot includes fourteen symbols, configuring the number m of synchronization signal blocks to be transmitted in the slot to be two; and when a slot includes seven symbols, configuring the number m of synchronization signal blocks to be transmitted in the slot to be one.

Optionally, associating symbols occupied by a common control channel with the m synchronization signal blocks based on the number m may include: when m is two, associating two symbols occupied by the common control channel with the two synchronization signal blocks, respectively.

Optionally, associating symbols occupied by a common control channel with the m synchronization signal blocks based on the number m may include: when m is one, selecting one symbol from two symbols occupied by the common control channel; and associating the one selected symbol with the one synchronization signal block.

Optionally, using beams for transmitting the m synchronization signal blocks to transmit to a terminal downlink control information of common control information corresponding to the associated symbols occupied by the common control channel may include: for each symbol occupied by the common control channel, the symbol occupied by the common control channel and the associated synchronization signal block sharing one beam.

Optionally, an occurring periodicity N of the common control channel and a period M of a synchronization signal burst set meet the following equations, $$N=K*M,$$

where K>=1 and K is an integer.

Optionally, prior to configuring the number m of synchronization signal blocks to be transmitted in a slot based on the number of symbols contained in the slot, the method may further include: determining the occurring periodicity N of the common control channel, and transmitting to the terminal the occurring periodicity N via system information.

Optionally, a beam of the physical downlink shared channel may be associated with a beam of the symbols occupied by the common control channel.

Optionally, the symbols occupied by the common control channel may be associated with the m synchronization signal blocks by any one of the following ways: using quasi co-location; or using a same antenna port.

Optionally, after the terminal performs cell selection or reselection, only a reference signal on the symbols occupied by the common control channel may be measured.

Optionally, the reference signal may include a demodulation reference signal of the common control channel or a channel state information reference signal.

In an embodiment, a method for receiving common control information is provided, including: receiving downlink control information of common control information via beams for receiving m synchronization signal blocks in a slot, wherein symbols occupied by a common control channel are associated with the m synchronization signal blocks; and receiving the common control information in a physical downlink shared channel indicated by the downlink control information.

Optionally, the symbols occupied by the common control channel being associated with the m synchronization signal blocks may include: the symbols occupied by the common control channel being associated with the m synchronization signal blocks using quasi co-location or using a same antenna port.

Optionally, default detection of the common control channel may be performed based on the associated relation between the symbols occupied by the common control channel and the m synchronization signal blocks.

In an embodiment, a base station is provided, including: a configuring circuitry, configured to configure the number m of synchronization signal blocks to be transmitted in a slot based on the number of symbols contained in the slot; an associating circuitry, configured to associate symbols occupied by a common control channel with the m synchronization signal blocks based on the number m; and a transmitting circuitry, configured to use beams for transmitting the m synchronization signal blocks to transmit to a terminal downlink control information of common control information corresponding to the associated symbols occupied by the common control channel, so that the terminal receives the common control information in a physical downlink shared channel indicated by the downlink control information.

Optionally, the number of the symbols occupied by the common control channel is two.

Optionally, the configuring circuitry may be configured to: when a slot includes fourteen symbols, configure the number m of synchronization signal blocks to be transmitted in the slot to be two; and when a slot includes seven symbols, configure the number m of synchronization signal blocks to be transmitted in the slot to be one.

Optionally, the associating circuitry may be configured to: when m is two, associate two symbols occupied by the common control channel with the two synchronization signal blocks, respectively.

Optionally, the associating circuitry may be configured to: when m is one, select one symbol from two symbols occupied by the common control channel; and associate the one selected symbol with the one synchronization signal block.

Optionally, for each symbol occupied by the common control channel, the symbol occupied by the common control channel and the associated synchronization signal block share one beam.

Optionally, an occurring periodicity N of the common control channel and a period M of a synchronization signal burst set meet the following equations, $$N=K*M,$$

where K>=1 and K is an integer.

Optionally, the base station may further include: a period configuring circuitry, configured to determine the occurring periodicity N of the common control channel, and transmit to the terminal the occurring periodicity N via system information.

Optionally, a beam of the physical downlink shared channel may be associated with a beam of the symbols occupied by the common control channel.

Optionally, the associating circuitry may be configured to associate symbols occupied by a common control channel with the m synchronization signal blocks by any one of the following ways: using quasi co-location; or using a same antenna port.

Optionally, after the terminal performs cell selection or reselection, only a reference signal on the symbols occupied by the common control channel may be measured.

Optionally, the reference signal may include a demodulation reference signal of the common control channel or a channel state information reference signal.

In an embodiment, a terminal is provided, including: a first receiving circuitry, configured to receive downlink control information of common control information via beams for receiving m synchronization signal blocks in a slot, wherein symbols occupied by a common control channel are associated with the m synchronization signal blocks; and a second receiving circuitry, configured to receive the common control information in a physical downlink shared channel indicated by the downlink control information.

Optionally, the symbols occupied by the common control channel being associated with the m synchronization signal blocks may include: the symbols occupied by the common control channel being associated with the m synchronization signal blocks using quasi co-location or using a same antenna port.

Optionally, the first receiving circuitry may be configured to perform default detection to the common control channel based on the associated relation between the symbols occupied by the common control channel and the m synchronization signal blocks.

In an embodiment, a storage medium which has computer instructions stored therein is provided, wherein once the computer instructions are executed, any one of the above methods for transmitting common control information is performed.

In an embodiment, a storage medium which has computer instructions stored therein is provided, wherein once the computer instructions are executed, any one of the above methods for transmitting common control information is performed.

Embodiments of the present disclosure may have following advantages. The number m of synchronization signal blocks to be transmitted in a slot is configured, symbols occupied by a common control channel are associated with the m synchronization signal blocks based on the number m, beams for transmitting the m synchronization signal blocks are used to transmit to a terminal downlink control information of common control information corresponding to the associated symbols occupied by the common control channel, so that the transmission of the common control information based on beam sweeping is realized, and the terminal receives the common control information in a physical downlink shared channel indicated by the downlink control information. Besides, as the common control channel and the synchronization signal blocks share a beam sweeping process, no extra beam sweeping process is needed and no new round of beam sweeping needs to be configured, which may reduce communication resource consumption.

Further, an occurring periodicity N of the common control channel and a period M of a synchronization signal burst set meet the following equations, $N=K*M$, where K>=1 and K is an integer. That is, the occurring periodicity N of the common control channel is K times of the period M of a synchronization signal burst set, which may reduce transmission overhead of the common control information.

Further, the base station may determine the occurring periodicity N of the common control channel, and transmit to the terminal the occurring periodicity N via system information. That is, a beam sweeping period of the common control channel may be determined by the base station, which may improve flexibility of transmission of the common control information.

Further, after the terminal performs cell selection or reselection, only a reference signal on the symbols occupied by the common control channel is measured, while the synchronization signal blocks do not need to be detected, which may reduce complexity of detection at the terminal.

DETAILED DESCRIPTION

Figure 1:
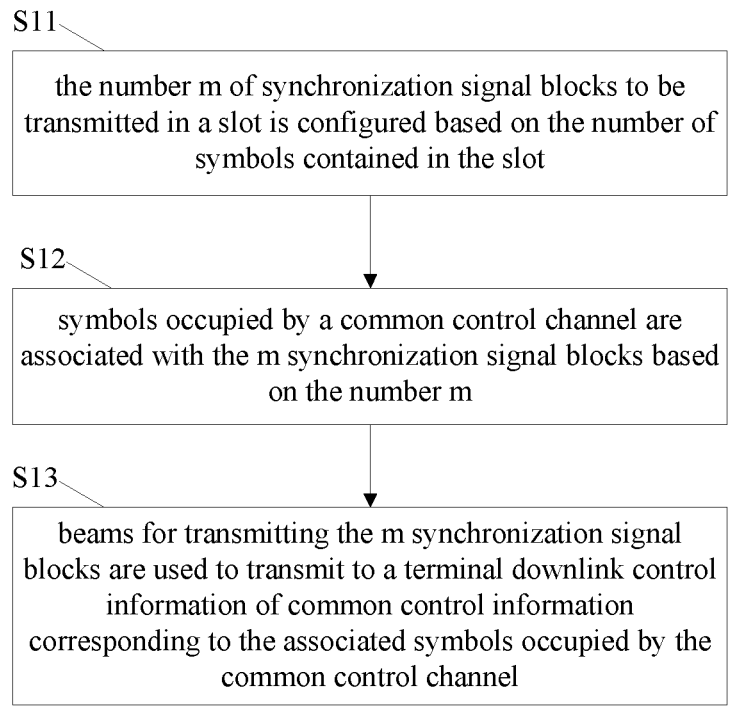
FIG. 1 schematically illustrates a flow chart of a method for transmitting common control information according to an embodiment.

In 5G systems, synchronization signals including Primary Synchronization Signal (PSS) and Secondary Synchronization Signal (SSS) and Physical Broadcast Channel (PBCH) are transmitted through synchronization signal blocks, and a beam sweeping function is introduced. Each synchronization signal block can be regarded as a beam during beam sweeping, i.e., a resource for beam in an analog domain. Multiple synchronization signal blocks constitute a synchronization signal burst (SS-burst). The SS-burst can be regarded as a set of relatively concentrated resource that contains multiple beams. Multiple SS-bursts constitute a synchronization signal burst set (SS-burst-set). Synchronization signal blocks being transmitted "repeatedly" on different beams is a beam sweeping process. By training of beam sweeping, a terminal may perceive from which beam a strongest signal is received.

A common control channel may also broadcast information by beam sweeping. The common control channel is one type of PDCCH. The common control channel may be also called a physical control channel that can serve terminals in various states, such as an idle state and the connected state, or a common search space or a search space set that can serve terminal in various states, or a UE Group Common PDCCH. The UE obtains DCI in the common control channel by blind detection and receives various common control information, such as system information or paging message, in a PDSCH indicated by the DCI. In some embodiments, the common control channel may include multiple common control channels.

Currently, the common control channel may adopt a new round of beam sweeping. Accordingly, new downlink slots or short slot resources are needed, which may limit an uplink-to-downlink ratio. Besides, reconfiguration of a round of beam sweeping by the base station may limit beams of frequency division multiplexing resources among resources used by the beam sweeping. Therefore, it is considered that the beam sweeping of the common control channel reuses the beam sweeping of the synchronization signal block.

A control resource set used by the common control channel is called CCRS. When common control information, such as system information or a paging message, needs to be transmitted, CCRS may be used to carry Common Search Space (CSS). When no common control information needs to be transmitted, CCRS may be used to carry a UE Specific Search Space.

However, how to use beam sweeping to realize the transmission of common control information with relatively low communication resource consumption becomes an urgent problem to be solved.

In embodiments of the present disclosure, the number m of synchronization signal blocks to be transmitted in a slot is configured, symbols occupied by a common control channel are associated with the m synchronization signal blocks based on the number m, beams for transmitting the m synchronization signal blocks are used to transmit to a terminal downlink control information of common control information corresponding to the associated symbols occupied by the common control channel, so that the transmission of the common control information based on beam sweeping is realized, and the terminal receives the common control information in a physical downlink shared channel indicated by the downlink control information. Besides, as the common control channel and the synchronization signal blocks share a beam sweeping process, no extra beam sweeping process is needed and no new round of beam sweeping needs to be configured, which may reduce communication resource consumption.

In order to clarify the object, solutions and advantages of embodiments of the present disclosure, embodiments of present disclosure will be described clearly in detail in conjunction with accompanying drawings.

FIG. 1 schematically illustrates a flow chart of a method for transmitting common control information according to an embodiment. Referring to FIG. 1, the method may include S11, S12 and S13.

In S11, the number m of synchronization signal blocks to be transmitted in a slot is configured based on the number of symbols contained in the slot.

In some embodiments, the number of the symbols occupied by the common control channel is two. Besides, as a unified design, a control resource set occupies first two symbols of a slot. Therefore, a common control resource set may occupy first two symbols of a slot.

In some embodiments, S11 may include: when a slot includes fourteen symbols, configuring the number m of synchronization signal blocks to be transmitted in the slot to be two; and when a slot includes seven symbols, configuring the number m of synchronization signal blocks to be transmitted in the slot to be one.

Specifically, in a synchronization signal block, a primary synchronization signal may occupy one symbol, a secondary synchronization signal may occupy one symbol, and a physical broadcast channel may occupy 2, 3 or 4 symbols. Therefore, the synchronization signal block may occupy 4, 5 or 6 symbols. For a slot of 14 symbols, 2 or 3 synchronization signal blocks may be transmitted in the slot. Besides, the common control resource set occupies the first two symbols of the slot. Therefore, it may be configured that 2 synchronization signal blocks are transmitted in a slot.

In S12, symbols occupied by a common control channel are associated with the m synchronization signal blocks based on the number m.

In some embodiments, symbols occupied by a common control channel include one or multiple search spaces or search space sets in the common control channel. In some embodiments, associating symbols occupied by a common control channel with the m synchronization signal blocks based on the number m may include: when m is two, associating two symbols occupied by the common control channel with the two synchronization signal blocks, respectively. That is, beam association may be performed between the two synchronization signal blocks and symbols occupied by the common control resource set (i.e., the two symbols occupied by the common control channel).

In some embodiments, associating symbols occupied by a common control channel with the m synchronization signal blocks based on the number m may include: when m is one, selecting one symbol from two symbols occupied by the common control channel; and associating the one selected symbol with the one synchronization signal block. That is, beam association is performed between the one synchronization signal block and the one symbol occupied by the common control resource set.

In S13, beams for transmitting the m synchronization signal blocks are used to transmit to a terminal downlink control information of common control information corresponding to the associated symbols occupied by the common control channel.

In some embodiments, the base station uses the beams for transmitting the m synchronization signal blocks to transmit to the terminal the downlink control information of the common control information corresponding to the associated symbols occupied by the common control channel. After receiving the downlink control information, the terminal receives the common control information in a physical downlink shared channel indicated by the downlink control information.

In some embodiments, using beams for transmitting the m synchronization signal blocks to transmit to a terminal downlink control information of common control information corresponding to the associated symbols occupied by the common control channel may include: for each symbol occupied by the common control channel, the symbol occupied by the common control channel and the associated synchronization signal block sharing one beam.

In some embodiments, when there are 14 symbols in a slot, the two synchronization signal blocks may share a beam sweeping process with 2 symbols occupied by the common control channel, respectively, which corresponds to two beams. For example, a symbol occupied by a first common control resource set is symbol 0 in the slot, and the symbol 0 can use the same beam as the first synchronization signal block. A symbol occupied by a second common control resource set is symbol 1 in the slot, and the symbol 1 can use the same beam as the second synchronization signal block.

In some embodiments, when there are 7 symbols in a slot, the one synchronization signal block shares a beam sweeping process with one symbol occupied by the common control channel, which corresponds to one beam. For example, if the first common control resource set occupies the symbol 1 in the slot, the symbol 1 can use the same beam as the one synchronization signal block.

In the existing techniques, the base station sends DCI to UE, and the UE obtains the DCI through blind detection method and receives various common control information in the PDSCH indicated by the DCI. The transmission of common control information cannot be implemented by beam sweeping, and communication resource consumption is relatively high.

In embodiments of the present disclosure, the number m of synchronization signal blocks to be transmitted in a slot is configured, symbols occupied by a common control channel are associated with the m synchronization signal blocks based on the number m, beams for transmitting the m synchronization signal blocks are used to transmit to a terminal downlink control information of common control information corresponding to the associated symbols occupied by the common control channel, so that the transmission of the common control information based on beam sweeping is realized, and the terminal receives the common control information in a physical downlink shared channel indicated by the downlink control information. Besides, as the common control channel and the synchronization signal blocks share a beam sweeping process, no extra beam sweeping process is needed and no new round of beam sweeping needs to be configured, which may reduce communication resource consumption.

Generally, beam sweeping of synchronization signal blocks has periodicity, that is, only one round of beam sweeping is performed during one synchronization signal burst period. Therefore, to reduce transmission overhead of the common control information, an occurring periodicity N of the common control channel and a period M of a synchronization signal burst set meet the following equations, N=K*M, where K>=1 and K is an integer. That is, the occurring periodicity of the common control channel is K times of the synchronization signal burst period. Those skilled in the art could understand that, occurring periodicity can be also called periodicity or occurring period, which indicates that the common control channel occurs periodically.

To improve flexibility of transmission of the common control information, a beam sweeping period of the common control channel may be determined by the base station. Prior to configuring the number m of synchronization signal blocks to be transmitted in a slot based on the number of symbols contained in the slot, the base station may determine the occurring periodicity N of the common control channel, and transmit to the terminal the occurring periodicity N via system information.

In some embodiments, a beam of the physical downlink shared channel may be associated with a beam of the symbols occupied by the common control channel, and the symbols occupied by the common control channel may carry the DCI of the common control information. The base station may schedule terminals associated with different beams to different PDSCH resources to demodulate and decode the common control information, where a beam of the PDSCH resources is associated with the beam of the symbols occupied by the common control channel.

In some embodiments, the symbols occupied by the common control channel are associated with the m synchronization signal blocks by any one of the following ways: using Quasi Co-Location (QCL); or using a same antenna port. That is, the base station may restrain a relation between a beam used by the synchronization signal blocks and a beam used by the symbols occupied by the common control channel through QCL, where the synchronization signal blocks and the symbols are quasi co-located. Optionally, the base station may restrain the relation through the same antenna port, where the synchronization signal blocks and the symbols (i.e., reference signals in the symbols) have same antenna ports respectively.

To reduce complexity of detection at the terminal, after the terminal performs cell selection or reselection, only a reference signal on the symbols occupied by the common control channel is measured, and the reference signal is used to obtain time-frequency synchronization and reference signal receiving power. Therefore, after the terminal performs cell selection or reselection, only the reference signal on the symbols needs to be detected to reach time-frequency synchronization with the base station. The synchronization signal blocks do not need to be detected, which may reduce complexity of detection at the terminal.

In some embodiments, the reference signal includes a demodulation reference signal of the common control channel or a channel state information reference signal (CSI-RS).

Figure 2:
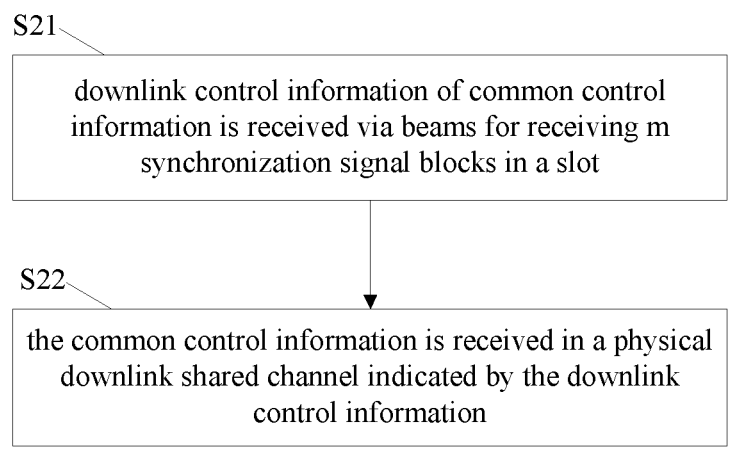
FIG. 2 schematically illustrates a flow chart of a method for receiving common control information according to an embodiment.

FIG. 2 schematically illustrates a flow chart of a method for receiving common control information according to an embodiment. Referring to FIG. 2, the method may include S21 and S22.

In S21, downlink control information of common control information is received via beams for receiving m synchronization signal blocks in a slot.

In some embodiments, symbols occupied by a common control channel are associated with the m synchronization signal blocks. For example, symbols occupied by a common control channel are associated with the m synchronization signal blocks using QCL or the same antenna port.

In some embodiments, a terminal may perform default detection of the common control channel based on the associated relation between the symbols occupied by the common control channel and the m synchronization signal blocks.

In S22, the common control information is received in a physical downlink shared channel indicated by the downlink control information.

Figure 3:
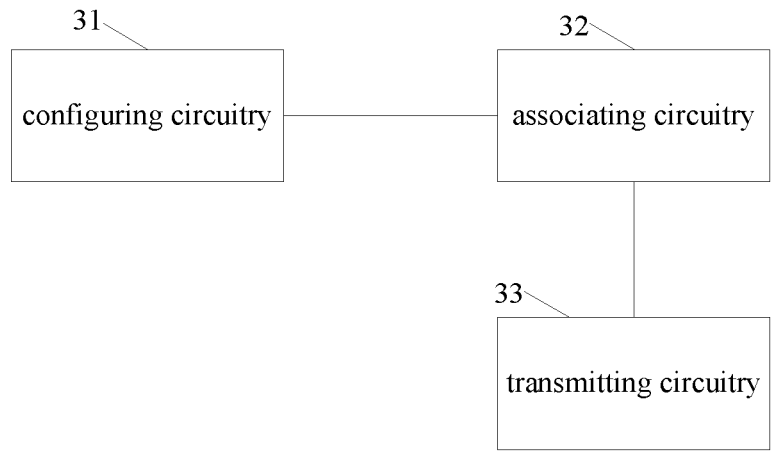
FIG. 3 schematically illustrates a block diagram of a base station according to an embodiment.

FIG. 3 schematically illustrates a block diagram of a base station according to an embodiment. Referring to FIG. 3, the base station may include a configuring circuitry 31, an associating circuitry 32 and a transmitting circuitry 33.

The configuring circuitry 31 may be configured to configure the number m of synchronization signal blocks to be transmitted in a slot based on the number of symbols contained in the slot.

The associating circuitry 32 may be configured to associate symbols occupied by a common control channel with the m synchronization signal blocks based on the number m.

The transmitting circuitry 33 may be configured to use beams for transmitting the m synchronization signal blocks to transmit to a terminal downlink control information of common control information corresponding to the associated symbols occupied by the common control channel, so that the terminal receives the common control information in a physical downlink shared channel indicated by the downlink control information.

From above, the configuring circuitry 31 configures the number m of synchronization signal blocks to be transmitted in a slot is configured, the associating circuitry 32 associates symbols occupied by a common control channel with the m synchronization signal blocks, the transmitting circuitry 33 uses beams for transmitting the m synchronization signal blocks to transmit to a terminal downlink control information of common control information corresponding to the associated symbols occupied by the common control channel, so that the transmission of the common control information based on beam sweeping is realized, and the terminal receives the common control information in a physical downlink shared channel indicated by the downlink control information. Besides, as the common control channel and the synchronization signal blocks share a beam sweeping process, no extra beam sweeping process is needed and no new round of beam sweeping needs to be configured, which may reduce communication resource consumption.

In some embodiments, the number of the symbols occupied by the common control channel is two.

In some embodiments, the configuring circuitry 31 may be configured to: when a slot includes fourteen symbols, configure the number m of synchronization signal blocks to be transmitted in the slot to be two; and when a slot includes seven symbols, configure the number m of synchronization signal blocks to be transmitted in the slot to be one.

In some embodiments, the associating circuitry 32 may be configured to: when m is two, associate two symbols occupied by the common control channel with the two synchronization signal blocks, respectively.

In some embodiments, the associating circuitry 32 may be configured to: when m is one, select one symbol from two symbols occupied by the common control channel; and associate the one selected symbol with the one synchronization signal block.

In some embodiments, for each symbol occupied by the common control channel, the symbol occupied by the common control channel and the associated synchronization signal block share one beam.

To reduce transmission overhead of the common control information, an occurring periodicity N of the common control channel and a period M of a synchronization signal burst set meet the following equations, $N=K*M$, where $K>=1$ and K is an integer.

To improve flexibility of transmission of the common control information, the base station further includes a period configuring circuitry, configured to: before the number m of synchronization signal blocks to be transmitted in a slot is configured based on the number of symbols contained in the slot, determine the occurring periodicity N of the common control channel, and transmit to the terminal the occurring periodicity N via system information.

In some embodiments, a beam of the physical downlink shared channel is associated with a beam of the symbols occupied by the common control channel.

In some embodiments, the associating circuitry 32 may be configured to associate symbols occupied by a common control channel with the m synchronization signal blocks by any one of the following ways: using quasi co-location; or using a same antenna port.

In some embodiments, after the terminal performs cell selection or reselection, only a reference signal on the symbols occupied by the common control channel is measured.

In some embodiments, the reference signal includes a demodulation reference signal of the common control channel or a channel state information reference signal.

Figure 4:
FIG. 4 schematically illustrates a block diagram of a terminal according to an embodiment.

FIG. 4 schematically illustrates a block diagram of a terminal according to an embodiment. Referring to FIG. 4, the terminal includes a first receiving circuitry 41 and a second receiving circuitry 42.

The first receiving circuitry 41 may be configured to receive downlink control information of common control information via beams for receiving m synchronization signal blocks in a slot, wherein symbols occupied by a common control channel are associated with the m synchronization signal blocks.

The second receiving circuitry 42 may be configured to receive the common control information in a physical downlink shared channel indicated by the downlink control information.

In some embodiments, the symbols occupied by the common control channel being associated with the m synchronization signal blocks includes: the symbols occupied by the common control channel being associated with the m synchronization signal blocks using quasi co-location or using a same antenna port.

In some embodiments, the first receiving circuitry 41 is configured to perform default detection to the common control channel based on the associated relation between the symbols occupied by the common control channel and the m synchronization signal blocks.

In an embodiment, a storage medium which has computer instructions stored therein, wherein once the computer instructions are executed, any one of the above methods for transmitting common control information (referring to FIG. 1) is performed.

In an embodiment, a storage medium which has computer instructions stored therein, wherein once the computer instructions are executed, any one of the above methods for receiving common control information (referring to FIG. 2) is performed.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for transmitting common control information, comprising:
   configuring the number m of synchronization signal blocks to be transmitted in a slot based on the number of symbols contained in the slot;
   associating symbols occupied by a common control channel with the m synchronization signal blocks based on the number m; and
   using beams for transmitting the m synchronization signal blocks to transmit to a terminal downlink control information of common control information corresponding to the associated symbols occupied by the common control channel, so that the terminal receives the common control information in a physical downlink shared channel indicated by the downlink control information.

2. The method according to claim 1, wherein the number of the symbols occupied by the common control channel is two.

3. The method according to claim 2, wherein configuring the number m of synchronization signal blocks to be transmitted in a slot based on the number of symbols contained in the slot comprises:
   when a slot comprises fourteen symbols, configuring the number m of synchronization signal blocks to be transmitted in the slot to be two; and
   when a slot comprises seven symbols, configuring the number m of synchronization signal blocks to be transmitted in the slot to be one.

4. The method according to claim 3, wherein associating symbols occupied by a common control channel with the m synchronization signal blocks based on the number m comprises:
   when m is two, associating two symbols occupied by the common control channel with the two synchronization signal blocks, respectively.

5. The method according to claim 3, wherein associating symbols occupied by a common control channel with the m synchronization signal blocks based on the number m comprises:
   when m is one, selecting one symbol from two symbols occupied by the common control channel; and
   associating the one selected symbol with the one synchronization signal block.

6. The method according to claim 1, wherein using beams for transmitting the m synchronization signal blocks to transmit to a terminal downlink control information of common control information corresponding to the associated symbols occupied by the common control channel comprises:
   for each symbol occupied by the common control channel, the symbol occupied by the common control channel and the associated synchronization signal block sharing one beam.

7. The method according to claim 1, wherein an occurring periodicity N of the common control channel and a period M of a synchronization signal burst set meet the following equations, $$N=K*M,$$

where K>=1 and K is an integer.

8. The method according to claim 1, wherein prior to configuring the number m of synchronization signal blocks to be transmitted in a slot based on the number of symbols contained in the slot, the method further comprises:
   determining the occurring periodicity N of the common control channel, and transmitting to the terminal the occurring periodicity N via system information.

9. The method according to claim 1, wherein a beam of the physical downlink shared channel is associated with a beam of the symbols occupied by the common control channel.

10. The method according to claim 1, wherein the symbols occupied by the common control channel are associated with the m synchronization signal blocks by any one of the following ways:
    using quasi co-location; or
    using a same antenna port.

11. The method according to claim 1, wherein the method further comprises the terminal performing cell selection or reselection, and after the terminal performs cell selection or reselection, only a reference signal on the symbols occupied by the common control channel is measured.

12. The method according to claim 11, wherein the reference signal comprises a demodulation reference signal of the common control channel or a channel state information reference signal.

13. A method for receiving common control information, comprising:
    receiving downlink control information of common control information via beams for receiving m synchronization signal blocks in a slot, wherein symbols occupied by a common control channel are associated with the m synchronization signal blocks; and
    receiving the common control information in a physical downlink shared channel indicated by the downlink control information.

14. The method according to claim 13, wherein the symbols occupied by the common control channel being associated with the m synchronization signal blocks comprises:
    the symbols occupied by the common control channel being associated with the m synchronization signal blocks using quasi co-location or using a same antenna port.

15. The method according to claim 13, wherein default detection of the common control channel is performed based on the associated relation between the symbols occupied by the common control channel and the m synchronization signal blocks.

16. A terminal, comprising:
   a first receiving circuitry, configured to receive downlink control information of common control information via beams for receiving m synchronization signal blocks in a slot, wherein symbols occupied by a common control channel are associated with the m synchronization signal blocks; and
   a second receiving circuitry, configured to receive the common control information in a physical downlink shared channel indicated by the downlink control information.

17. The terminal according to claim 16, wherein the symbols occupied by the common control channel being associated with the m synchronization signal blocks comprises:
   the symbols occupied by the common control channel being associated with the m synchronization signal blocks using quasi co-location or using a same antenna port.

18. The terminal according to claim 16, wherein the first receiving circuitry is configured to perform default detection to the common control channel based on the associated relation between the symbols occupied by the common control channel and the m synchronization signal blocks.

* * * * *